INVENTOR.
George R. Briggs
BY
Carl V. Olson
ATTORNEY

MAGNETIC METAL SHEET MEMORY ARRAY AND METHOD OF MAKING IT

Filed Oct. 10, 1960 2 Sheets-Sheet 2

INVENTOR.
George R. Briggs
BY
Carl V. Olson
ATTORNEY

United States Patent Office 3,206,732
Patented Sept. 14, 1965

3,206,732
MAGNETIC METAL SHEET MEMORY ARRAY AND METHOD OF MAKING IT

George R. Briggs, Princeton, N.J., assignor to Radio Corporation of America, a corporation of Delaware Filed Oct. 10, 1960, Ser. No. 61,438
12 Claims. (Cl. 340—174)

This invention relates to magnetic metal sheet random access memory arrays and methods of making them, and more particularly to memory arrays of very large storage capacity and small physical size which are capable of operation at high speeds. Memory arrays are useful in electronic computer and data processing apparatus.

It is known to construct a memory array consisting of a large number of magnetic toroidal cores arranged in rows and columns and threaded with wire conductors or windings by means of which the direction of magnetization in the cores can be selectively changed for the purpose of storing information therein, and for the purpose of reading out the stored information. Such memory arrays cannot be made as small and as fast in operation as is desired, and their construction is expensive in requiring painstaking laborious manual threading of the wire conductors through the cores.

It is also known to construct a memory array of a magnetic plate or sheet having rows and columns of apertures, and having conductors printed on the sheet to form windings extending through the apertures. The region of the magnetic sheet surrounding each aperture is employed for storing information. A disadvantage of such apertured magnetic sheets is that there is a tendency for the information represented by the magnetic flux around one aperture to extend to the region of other apertures and cause cross talk and unreliable operation.

It is an object of this invention to provide an improved apertured magnetic metal sheet memory array of very large bit capacity and small physical size which is capable of fast and reliable operation.

It is another object to provide an improved apertured magnetic sheet memory array wherein the magnetic flux around one aperture is obstructed from spreading to the regions of other apertures.

It is still another object to provide an improved magnetic metal sheet memory array wherein the magnetic flux in each memory element is substantially confined to a magnetic annulus which is separated around its periphery from the rest of the metal sheet.

It is a further object of the invention to provide an improved magnetic sheet memory array wherein the magnetic flux in each memory element is substantially confined to a metal annulus and wherein the printed windings linking the annulus do not link any part of the rest of the magnetic sheet.

It is a still further object of the invention to provide improved methods for the economical construction of magnetic sheet memory arrays capable of very fast operation by virtue of being very small in physical dimensions, and operative with a minimum of disturbing interference between storage elements of the array.

According to one aspect of the invention, a magnetic metal sheet memory array has a plurality of storage apertures around which a magnetic flux can be established and stored, and the sheet is provided with narrow gaps to obstruct the spreading of flux from the region of one aperture to the region of other apertures. The narrow gaps may completely surround each aperture forming magnetic metal annuli separated from the rest of the metal sheet. The words magnetic annulus, as used herein, mean any configuration of magnetic material providing a confining closed loop flux path, and are not limited in meaning to a toroidal configuration of magnetic material.

The metal annuli are secured to the rest of the metal sheet by means of a layer of material such as photoresist. The sheet including the walls of the apertures, is coated with an insulating material such as paint or epoxy resin, or an insulating and shock absorbing material such as silicone rubber. Windings printed on the paint or rubber coating extend through the apertures. The sheet may also be provided with auxiliary apertures near the storage apertures, and the windings may be printed to extend through the storage apertures and the auxiliary apertures in such a manner as to link solely the metal annuli and to avoid linking any of the rest of the metal sheet.

In another aspect the invention comprises the method of constructing a magnetic metal sheet memory array including the steps of covering one side of the metal sheet in a first pattern defining a plurality of apertures, covering the other side of the metal sheet in a pattern the same as and registered with the first pattern but also defining narrow gaps between the apertures, which gaps may encircle or surround the apertures, removing portions of the metal sheet in accordance with the patterns, applying an insulating and preferably shock absorbing coating to the sheet including the walls of the apertures, and printing windings on the coating which link the apertures.

These and other objects and aspects of the invention will be apparent to those skilled in the art from the following more detailed description taken in conjunction with the appended drawings, wherein.

Figures 1, 2, 3, 4, 5:
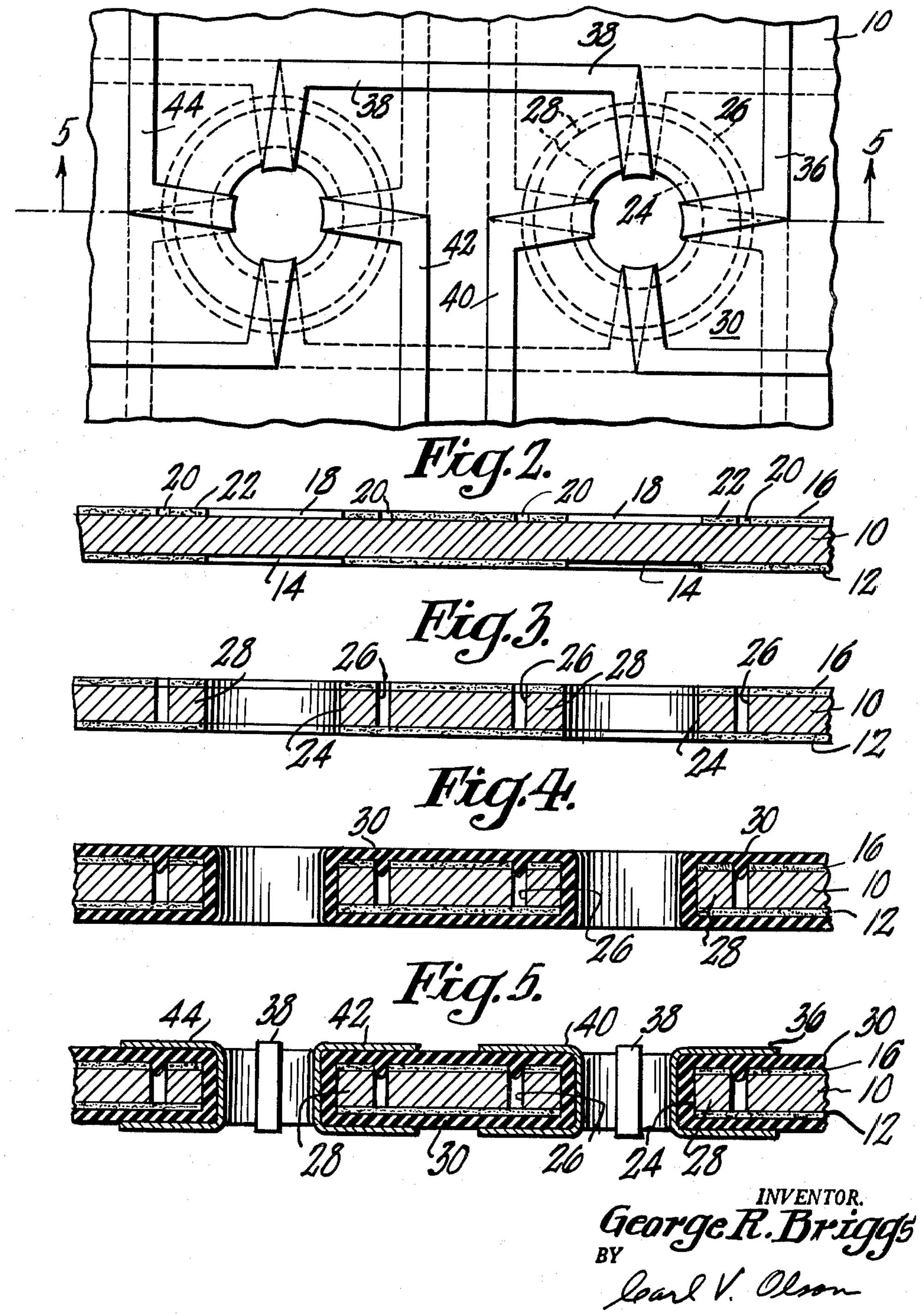
FIGURE 1 is a plan view of a fragmentary portion of a magnetic metal sheet memory array constructed according to the teachings of the invention.
FIGURES 2 through 5 are sectional views illustrating successive steps in the construction of the memory array of FIGURE 1.

Reference will now be made to FIGURES 1 through 5 for a description of one embodiment of the invention, and the method by which it is constructed. FIGURE 1 shows a small fragmentary portion of a magnetic sheet memory array having a large number of memory units arranged in rows and columns, only two of the memory units being shown in FIGURE 1. The memory array is constructed from a sheet 10 of magnetic material having a substantially rectangular hysteresis loop characteristic. The sheet 10 may be made of an annealed metal such as 4–78 molybdenum-permalloy, 50–50 nickel-iron alloy, a nickel-iron alloy having nickel in the range of from 65 to 90 percent, or an alloy of composition 49 Fe, 49 Co, 2 V, for example. The sheet 10 is preferably thin, having a thickness in the order from 0.1 to 2 mils (thousandths of an inch). As the thickness of the sheet is reduced, the eddy current losses are reduced and the obtainable speed of operation is increased.

The magnetic sheet 10 is first covered on both sides with a layer of plastic material, such as a photoresist material. A suitable photoresist is known in the trade as "KPR" and is sold by Eastman Kodak Company. The photoresist on the bottom side of the sheet is then exposed to light in a pattern defining a plurality of storage apertures. The photoresist on the top side of the sheet is also exposed to light in the same pattern and in register with the pattern on the bottom side, and in addition with a pattern of narrow gaps between the storage apertures. The pattern of gaps may be such that a gap completely surrounds one aperture, or may be merely a gap positioned between adjacent apertures.

The exposed photoresist layers on both sides of the magnetic sheet 10 are then developed to remove the photoresist layer in those areas that were not exposed to light. The resulting structure is as illustrated in FIGURE 2 which shows the magnetic sheet 10 having a photoresist layer 12 on the bottom side having circular areas 14 removed to expose the magnetic sheet 10 where storage apertures are desired. The photoresist layer 16 on the top of magnetic sheet 10 similarly has removed circular areas 18 in register with the circular areas 14 on the bottom side. The photoresist layer 16 on the top side is also provided with narrow grooves or gaps 20 which surround the circular areas 18 an ddefine annular configurations 22 of photoresist material therebetween.

The structure shown in FIGURE 2 is then subjected to an etching solution as, for example, by applying a fine spray of warm ferric chloride solution to the sheet when supported in a vertical position. The etchant removes the metal of the metal sheet in those areas not covered by the photoresist layer. The resulting structure is as illustrated in FIGURE 3 which shows the magnetic sheet 10 provided with circular apertures 24, and provided with narrow grooves or gaps 26 surrounding the apertures. The apertures 24 and gaps 26 define magnetic metal annuli 28 therebetween which are completely separated from the main body of the magnetic sheet. The magnetic annuli 28 are physically secured to the rest of the magnetic sheet by means of the photoresist layer 12 on the bottom of the sheet.

The next step in the process is the coating of the structure of FIGURE 3 with an insulating, or insulating and shock absorbing, coating to provide the structure shown in FIGURE 4. If the sheet 10 is thin, the coating 30 in FIGURE 4 preferably consists of a silicone rubber composition, such as the material known in the trade as "Silastic" which is made by the Dow Corning Chemical Company. The rubber is preferably sprayed on the sheet and it solidifies after a given time period as the result of a chemical reaction induced by a catalyst or hardener. The coating is applied to both sides of the sheet and also to the inner walls of the apertures 24. The silicone rubber coating 30 may or may not fill the narrow gaps 26, depending on the actual physical dimensions employed. The photoresist layer 12 on the bottom of the magnetic sheet is not removed prior to the application of the silicone rubber coating to the structure of FIGURE 3. This is because the photoresist layer 12 is employed to hold the magnetic annuli 28 in position with respect to the rest of the magnetic metal sheet. There is no undesirable effect resulting from leaving the photoresist layers on the magnetic sheet. If the finished magnetic sheet memory array is subjected to high ambient temperatures, such as over 250 degrees centigrade, which the silicone rubber and other component parts are capable of withstanding, the photoresist will merely break down or partially decompose without distorting the structure or causing any deleterious effect.

The next step in the process is the printing of electrical conductors or windings extending through the storage apertures 24. The windings are printed on top of the silicone rubber coating in such a way as to extend from one side of the sheet and through an aperture to the other side of the sheet. The resulting structure is illustrated in FIGURES 1 and 5 showing windings 36, 38, 40, 42 and 44.

It will be noted that the windings extend through the apertures. The winding 38 goes through the apertures associated with the two storage elements in opposite directions. While it may be loosely said that the windings link the apertures 24, it is more accurate to say that the windings link the magnetic material surrounding the apertures. The windings link both the magnetic metal annuli 28 and some of the magnetic material surrounding the annuli 28. An arrangement wherein the windings link solely the annuli will be described in connection with FIGURES 6 and 7.

The windings shown in FIGURES 1 and 5 may be printed by any suitable method, but they are preferably printed by first coating the structure shown in FIGURE 4 with a thin film of copper by the vacuum evaporation process. The copper film is then covered with a layer of photoresist which is exposed in a pattern defining the space between the desired conductive windings. The photoresist is then developed and the structure is etched, using standard printed circuit methods, to remove the thin film of copper from everywhere except the desired conduction paths. Thereafter, the photoresist on the copper film is washed away and the copper film windings are built up to the desired thickness by an electroplating process.

The resulting sheet memory array shown in FIGURES 1 and 5 is one wherein the magnetic storage annuli 28 are electrically and mechanically insulated from the printed windings. The feature of mechanical insulation is of considerable importance because if mechanical stresses are imparted from the windings to the magnetic annuli, the magnetic properties of the annuli may be altered and distorted. The transmission of the mechanical forces from the windings to the magnetic annuli is prevented by the cushioning effect of the silicone rubber coating therebetween. Silicone rubber is a particularly desirable material for this purpose because it is stable at high temperatures and it provides a good surface to which printed windings will adhere.

It is apparent from the foregoing that the sheet memory array of FIGURES 1 and 5 is constructed by a process involving a small number of steps. The memory array can be made to have very small physical dimensions, and it is rugged and reliable without requiring a separate supporting substrate. Mechanical support is provided by the photoresist required in the manufacturing process and by the coating required for insulation.

Figure 6:
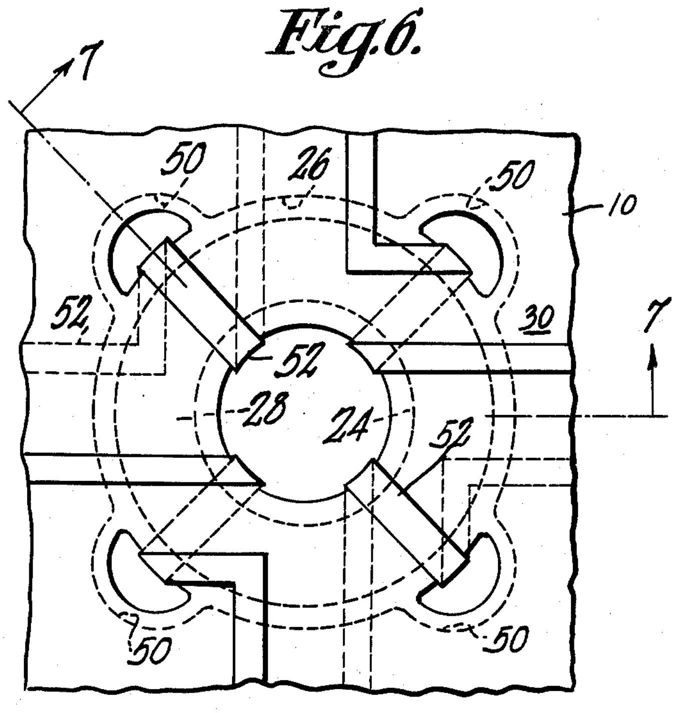
FIGURE 6 is a plan view illustrating another embodiment of the invention.
Figure 7:
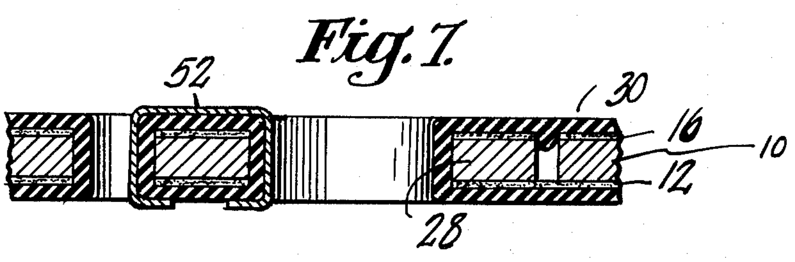
FIGURE 7 is a sectional view taken on the line 7—7 of FIGURE 6.

Reference will now be made to FIGURES 6 and 7 for a description of a second embodiment of the invention which can be constructed by the same process described in connection with the embodiment of FIGURES 1 and 5. The embodiment of FIGURES 6 and 7 is similar to that of FIGURES 1 and 5, but it includes additional auxiliary apertures 50 surrounding the main or storage aperture 24. The auxiliary apertures 50 are connected with the narrow gap 26 surrounding the main aperture 24. The auxiliary apertures 50 are formed by the same method employed in forming the main aperture 24, that is, by creating a pattern of developed photoresist on both sides of the sheet and etching the sheet from both sides. The width of the gaps 26 connecting auxiliary apertures 50 is maintained at a sufficiently small dimension so that the photoresist layer on the bottom of the sheet has a small distance to bridge in securing the magnetic annulus 28 to the rest of the magnetic sheet.

The purpose of the auxiliary apertures 50 is to permit a winding configuration such that the winding links solely the annulus 28 and does not link any of the rest of the magnetic sheet. It will be seen by reference to FIGURE 6 that the winding 52 comes up out of the main aperture 24 and goes down into the auxiliary aperture 50 to encircle the annulus 28 without encircling or linking any of the rest of the magnetic sheet 10. This construction prevents the generation, transmission, and picking up of spurious disturbances during reading in and reading out information from the memory array.

While the invention has been described in connection with a geometry wherein each storage element is constituted by the magnetic material surrounding a circular aperture or is constituted by a magnetic toroid, it will be understood that the teachings of the invention are equally applicable to storage units of other physical configurations. For example, the invention may be applied to arrangements wherein each storage element or annulus is of the transfluxor type having a plurality of apertures and a plurality of flux paths.

It is thus apparent according to the invention there are provided improved magnetic sheet memory arrays, and methods of making them, which can be physically very small, which are fast and reliable in operation, and which are relatively simple and economical to manufacture.

What is claimed is:

1. An array of memory elements comprising a sheet of magnetic material having openings in which are located magnetic annuli separated from the remainder of said sheet, by etched gaps, and a layer of plastic material adhered to said sheet and said annuli to secure them together.

2. A magnetic metal sheet memory array comprising a magnetic sheet having openings in which are located magnetic memory elements separated from the magnetic sheet by etched narrow gaps, said memory elements having apertures around which a rectangular magnetic flux can be created and stored, said narrow gaps being operative to obstruct the undesired spreading of flux from around one aperture to the region of another aperture; a silicone rubber coating on the surfaces of said sheet and memory elements, on the walls of said apertures and bridging said gaps; and printed windings on said rubber coating extending through said apertures.

3. A magnetic metal sheet memory array comprising a magnetic metal sheet having openings in which are located metal annuli separated from the magnetic sheet by etched narrow gaps, said annuli having apertures therein, a layer on one side of said sheet bridging said gaps and securing said annuli to the rest of said sheet, an insulating coating covering the surfaces of said sheet and the walls of said apertures and bridging said gaps, and printed windings on said coating linking said apertures and bridging said gaps.

4. A magnetic metal sheet memory array as defined in claim 3 wherein said layer is processed photoresist.

5. A magnetic metal sheet memory array as defined in claim 3 wherein said insulating coating is silicone rubber.

6. A magnetic metal sheet memory array comprising a magnetic metal sheet having openings in which are located metal annuli, said annuli having main apertures therein and said gaps being enlarged in places to form auxiliary apertures, a layer on one side of said sheet bridging said gaps and securing said annuli to the rest of the sheet, an insulating coating covering the surfaces of said sheet and the walls of said apertures and bridging said gaps, and printed windings on said insulating coating linking solely said annuli by extending through said main and auxiliary apertures.

7. A magnetic metal sheet memory array as defined in claim 6 wherein said layer is processed photoresist.

8. A magnetic metal sheet memory array as defined in claim 6 wherein said insulating coating is silicone rubber.

9. A magnetic metal sheet memory array comprising a magnetic sheet having openings in which are located magnetic memory elements separated from the magnetic sheet by etched narrow gaps, said memory elements having apertures therein, a layer of photoresist on one surface of said sheet bridging said gaps but not said apertures, a silicone rubber coating on the surfaces of the foregoing including the walls of said apertures, and printed windings on said rubber coating extending through said apertures.

10. A magnetic metal sheet memory array comprising a magnetic sheet having openings in which are located metal annuli separated from the magnetic sheet by etched narrow gaps, said annuli having apertures therein, and a layer of processed photoresist on one surface of said sheet bridging said gaps but not said apertures.

11. A magnetic metal sheet memory array comprising a magnetic sheet having openings in which are located metal annuli separated from the magnetic sheet by etched narrow gaps, said annuli having apertures therein, a layer of photoresist on one surface of said sheet bridging said gaps but not said apertures, a silicone rubber coating on the surfaces of the foregoing including the walls of said apertures, and printed windings on said rubber coating extending through said apertures and bridging said gaps.

12. A magnetic metal sheet memory array comprising a magnetic sheet having openings in which are located metal annuli, said annuli having main apertures therein and said gaps being enlarged in places to form auxiliary apertures, a layer of photoresist on one surface of said sheet bridging said gaps but not said apertures, a silicone rubber coating on the surfaces of the foregoing including the walls of said apertures, and printed windings on said rubber coating linking solely said annuli by extending through said main and auxiliary apertures.

References Cited by the Examiner

UNITED STATES PATENTS

| | | | |
|---|---|---|---|
| 2,877,540 | 3/59 | Austen | 29—155.5 |
| 2,878,463 | 3/59 | Austen | 340—174 |
| 2,901,736 | 8/59 | Sylvester | 340—174 |
| 2,961,745 | 11/60 | Smith | 29—155.5 |
| 2,970,296 | 1/61 | Horton | 340—174 |

IRVING L. SRAGOW, *Primary Examiner.*

JOHN F. BURNS, *Examiner.*